Jan. 14, 1941.   L. D. SOUBIER ET AL   2,228,614
APPARATUS FOR CURING AND MOLDING SYNTHETIC RESINS
Filed April 16, 1938   6 Sheets-Sheet 1
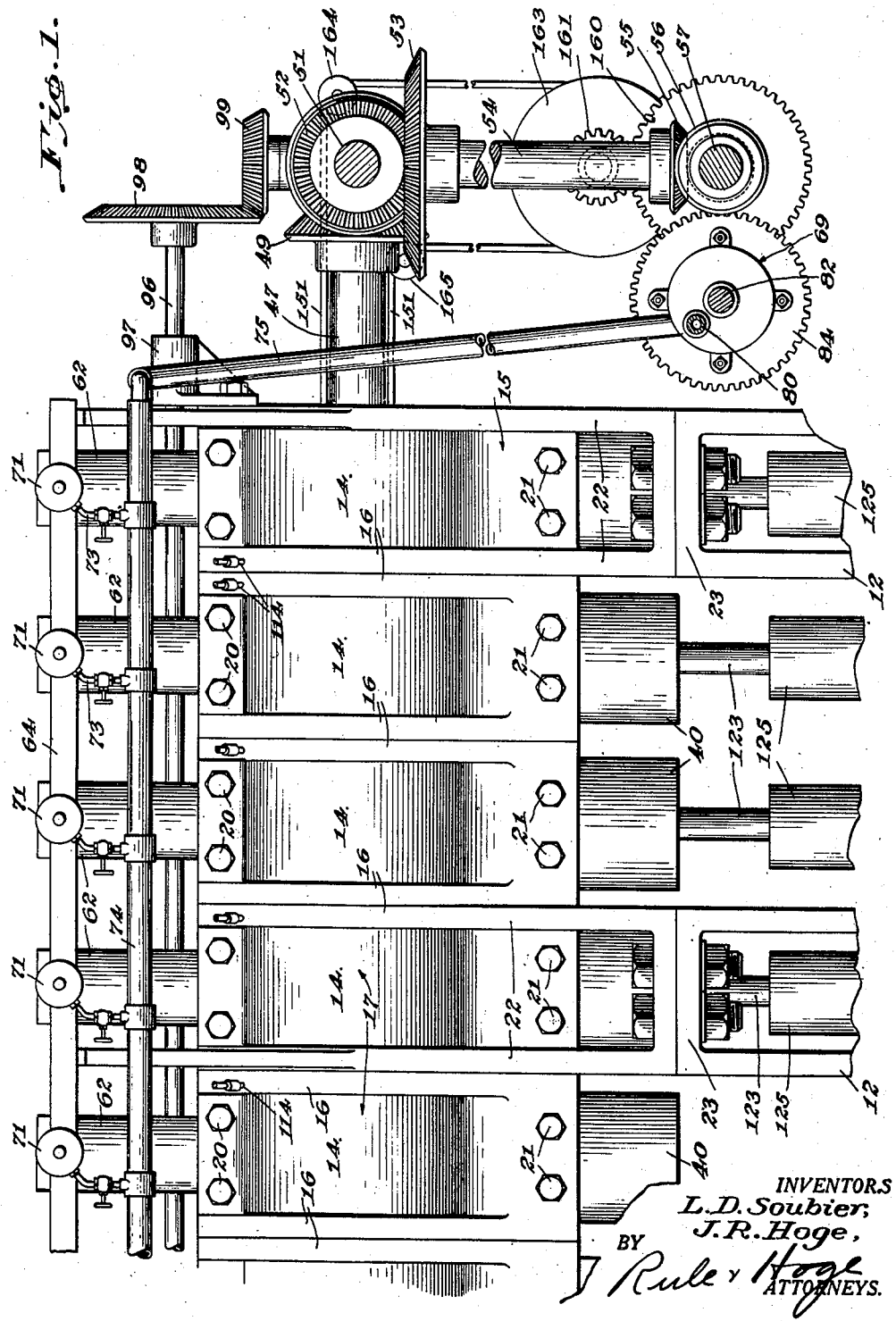
INVENTORS
L. D. Soubier,
J. R. Hoge,
BY
Rule & Hoge
ATTORNEYS.

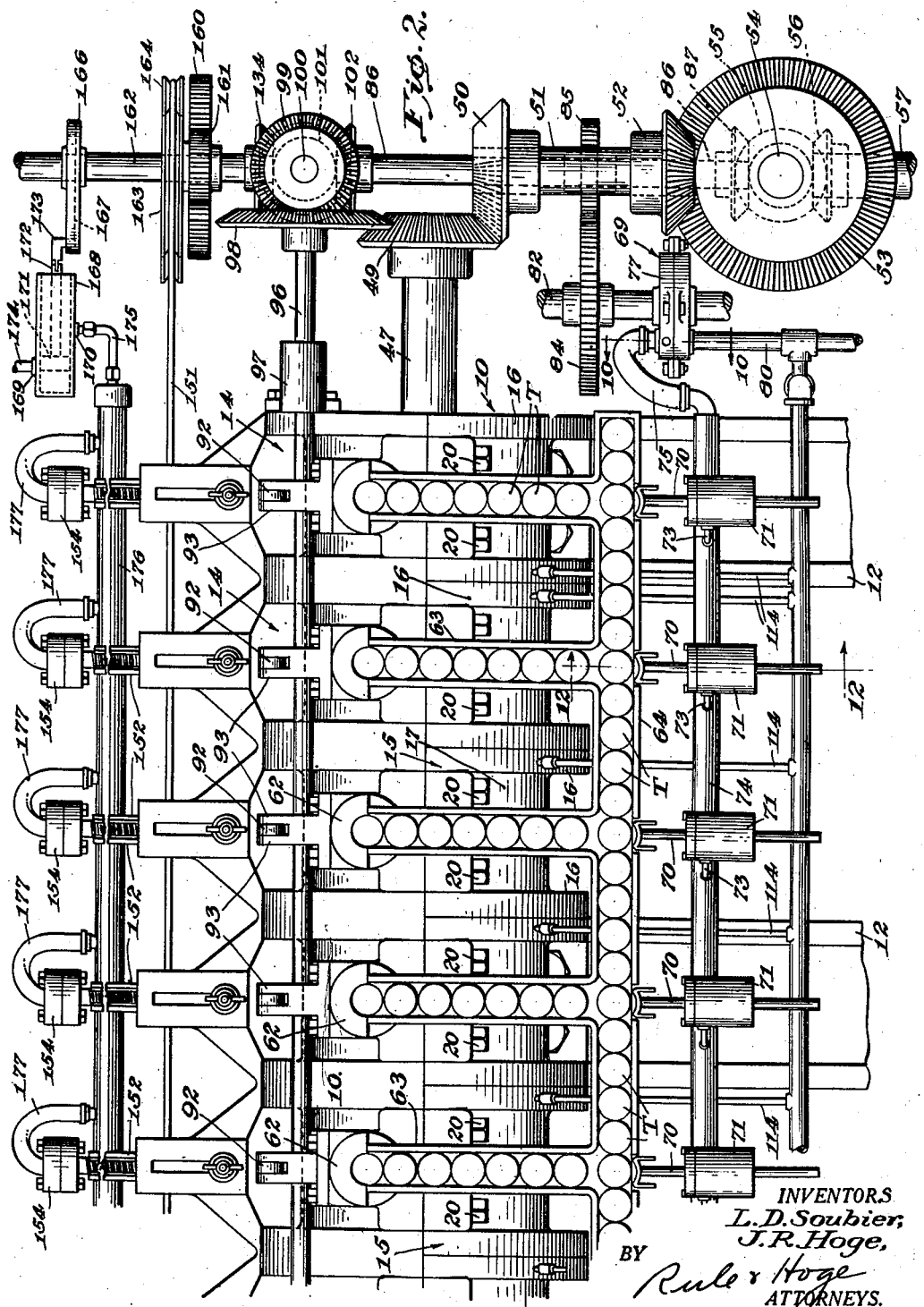

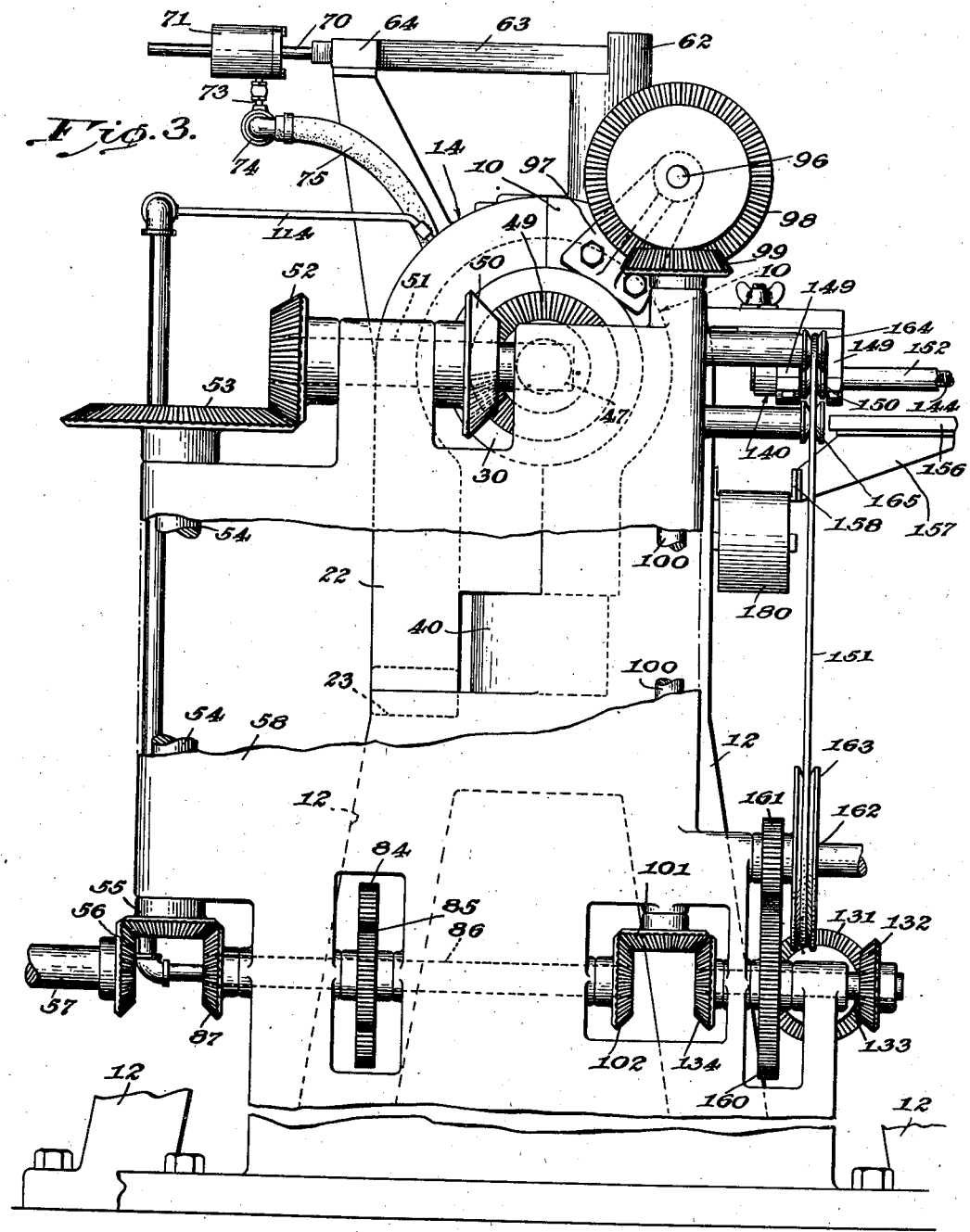

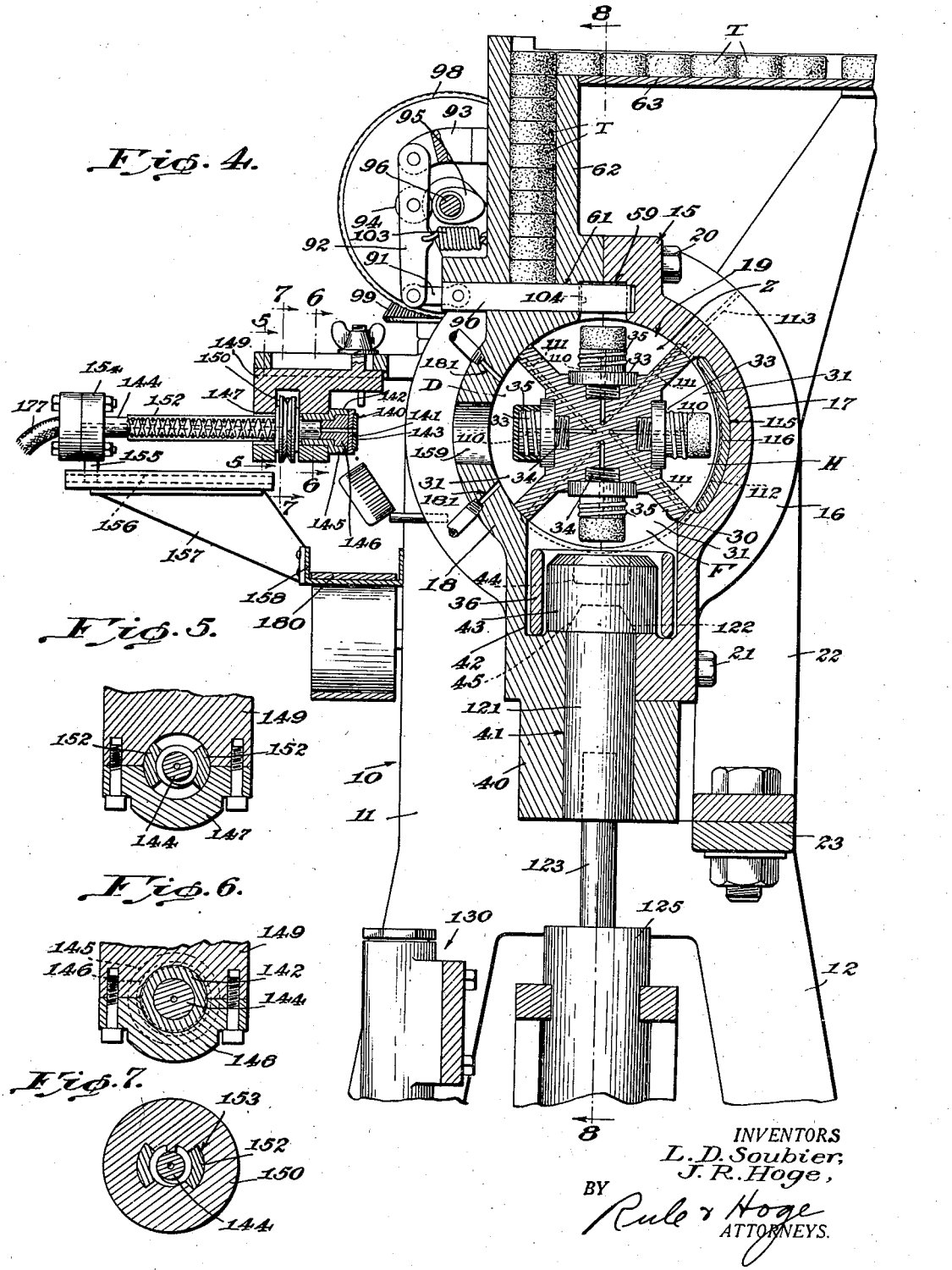

Jan. 14, 1941.   L. D. SOUBIER ET AL   2,228,614
APPARATUS FOR CURING AND MOLDING SYNTHETIC RESINS
Filed April 16, 1938   6 Sheets-Sheet 5

INVENTORS
L. D. Soubier,
J. R. Hoge,
BY Rule & Hoge
ATTORNEYS.

Jan. 14, 1941.  L. D. SOUBIER ET AL  2,228,614
APPARATUS FOR CURING AND MOLDING SYNTHETIC RESINS
Filed April 16, 1938  6 Sheets-Sheet 6
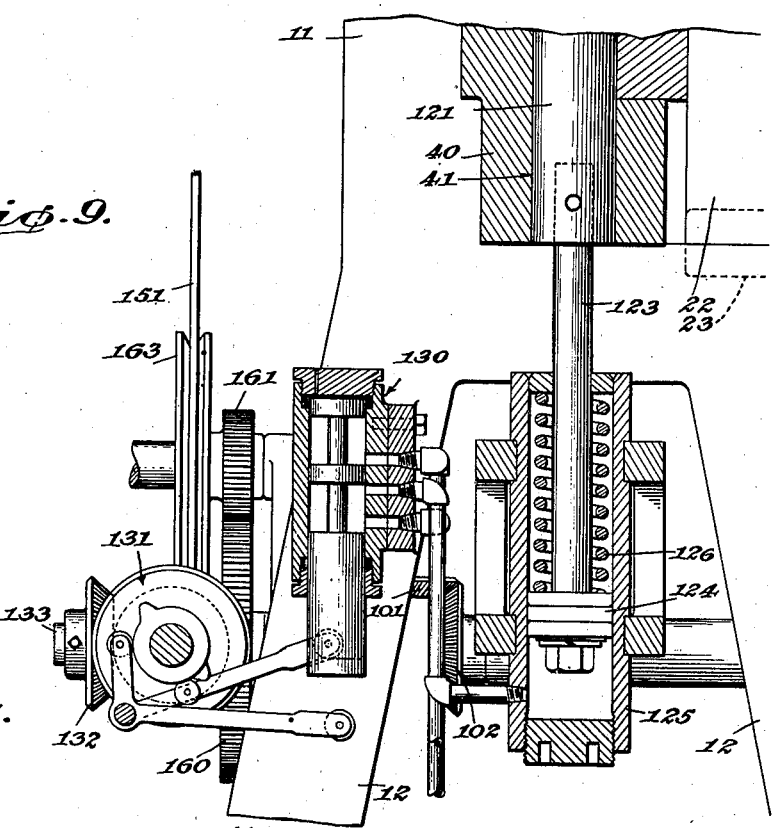
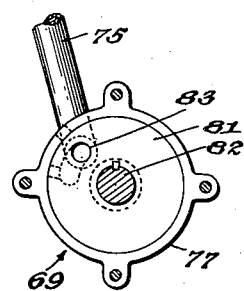
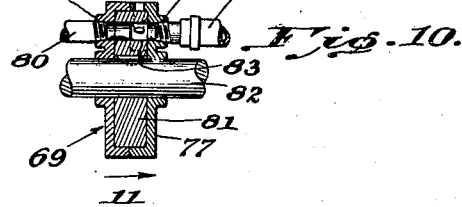
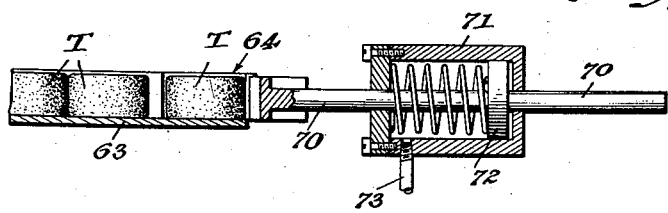
INVENTORS
L. D. Soubier,
J. R. Hoge,
BY
Rule & Hoge
ATTORNEYS.

Patented Jan. 14, 1941

2,228,614

UNITED STATES PATENT OFFICE 2,228,614

APPARATUS FOR CURING AND MOLDING SYNTHETIC RESINS

Leonard D. Soubier and John R. Hoge, Toledo, Ohio, assignors to Owens-Illinois Glass Company, a corporation of Ohio Application April 16, 1938, Serial No. 202,524

5 Claims. (Cl. 18—21)

The present invention relates to an apparatus for curing and molding synthetic or natural resins and other types of thermosetting organic plastic materials capable of being molded and cured by the combined action of heat and pressure, these products being utilized in the form of compressed masses commonly referred to as tablets, pellets or preforms.

Briefly, the invention is illustrated in connection with a machine for forming threaded bottle caps and contemplates the provision of a molding apparatus including a series of stationary mold heads contiguously arranged in straight line formation. Each mold head includes a rotor having disposed thereon a series of radially extending forming mandrels and capable of being indexed in order to periodically shift the respective positions of the mandrels and move the same successively through a charging zone where a tablet of the moldable material is placed thereon, a heating zone where the tablets on the mandrels are preheated, a forming zone where a mold having an open mold cavity is brought into forming engagement with the mandrels, and a discharging zone where the formed caps are unscrewed from the mandrels and are discharged from the machine. The charging, preheating, forming and discharging operations are carried out simultaneously in each head on different tablets, and the tablets introduced into each head are each progressively acted upon by the heating, forming and discharging instrumentalities. Furthermore, the charging, preheating, forming and discharging operations in all of the heads are carried out in unison. Thus, during each complete cycle of machine operation the number of formed caps discharged from the machine is a multiple of the number of mold heads provided in the machine which is in direct proportion to the number of mandrels provided on each rotor.

The objects of the invention are manifold. Among the principal objects thereof is the provision of a molding apparatus of the type set forth above, in which the mechanical motions and functions performed by the mandrel-charging, mandrel-indexing, charge-preheating, charge-forming and cap-discharging instrumentalities are repeated during each quarter-cycle of machine operation, yet in which these motions and functions are performed on different mandrels and charges thereon, thus resulting in an apparatus in which the various stages of machine operation overlap each other in such a manner that during each quarter-cycle of machine operation, completed articles are discharged from each machine unit or head. The machine is capable of modification and by the simple expedient of increasing the number of mandrels contained in each head, completed articles may be discharged from each mold head during each one-sixth, one-eighth or an even smaller fraction of each machine cycle.

The apparatus by means of which the above mentioned object may be accomplished is distinguished from the general type of stationary or rotary molding machine wherein the various stages of machine operation follow in sequence and wherein the instrumentalities by means of which each stage is brought about discharge their functions but once during each complete cycle of machine operation. Such machines may well be termed "single phase" machines in that only once during a complete machine cycle do the various operating instrumentalities enter upon their particular phase of activity. The present machine may well be termed a "four-phase," a "six-phase," or an "eight-phase" machine, as the case may be, inasmuch as four, six or eight times during each machine cycle, the various operating instrumentalities may become operative.

In carrying out the above mentioned object, the overlapping stages of machine operation permit a material reduction in the size of machine required to produce a given number of articles in a given interval of time and in the area of floor space required for installation of the machine. In a machine having four mandrels in each head, it has been calculated that the floor space may be reduced by three-quarters and, if the number of mandrels is increased, an even greater reduction in floor space may be effected.

Simplicity of construction, ruggedness and durability, and the provision of a machine which is comprised of a minimum number of moving parts are further desiderata that have been borne in mind in the production and development of the present invention.

In the accompanying drawings one embodiment of the invention is shown. In these drawings:

Fig. 1 is a fragmentary side elevational view of a molding apparatus constructed in accordance with the principles of the present invention, certain parts thereof being shown in section;

Fig. 2 is a fragmentary top plan view thereof;

Fig. 3 is an end view of the apparatus;

Fig. 4 is a vertical transverse sectional view taken through one of the mold heads associated with the apparatus;

Fig. 5 is a sectional view taken substantially along the line 5—5 of Fig. 4;

Fig. 6 is a sectional view taken substantially along the line 6—6 of Fig. 4;

Fig. 7 is a sectional view taken substantially along the line 7—7 of Fig. 4;

Fig. 9 is a transverse sectional view taken through a control valve and its associated instrumentalities employed in connection with the present invention;

Fig. 10 is a sectional view taken substantially along the line 10—10 of Fig. 2;

Fig. 11 is a sectional view taken substantially along the line 11—11 of Fig. 10; and Fig. 12 is a sectional view taken substantially along the line 12—12 of Fig. 2.

Figure 8:
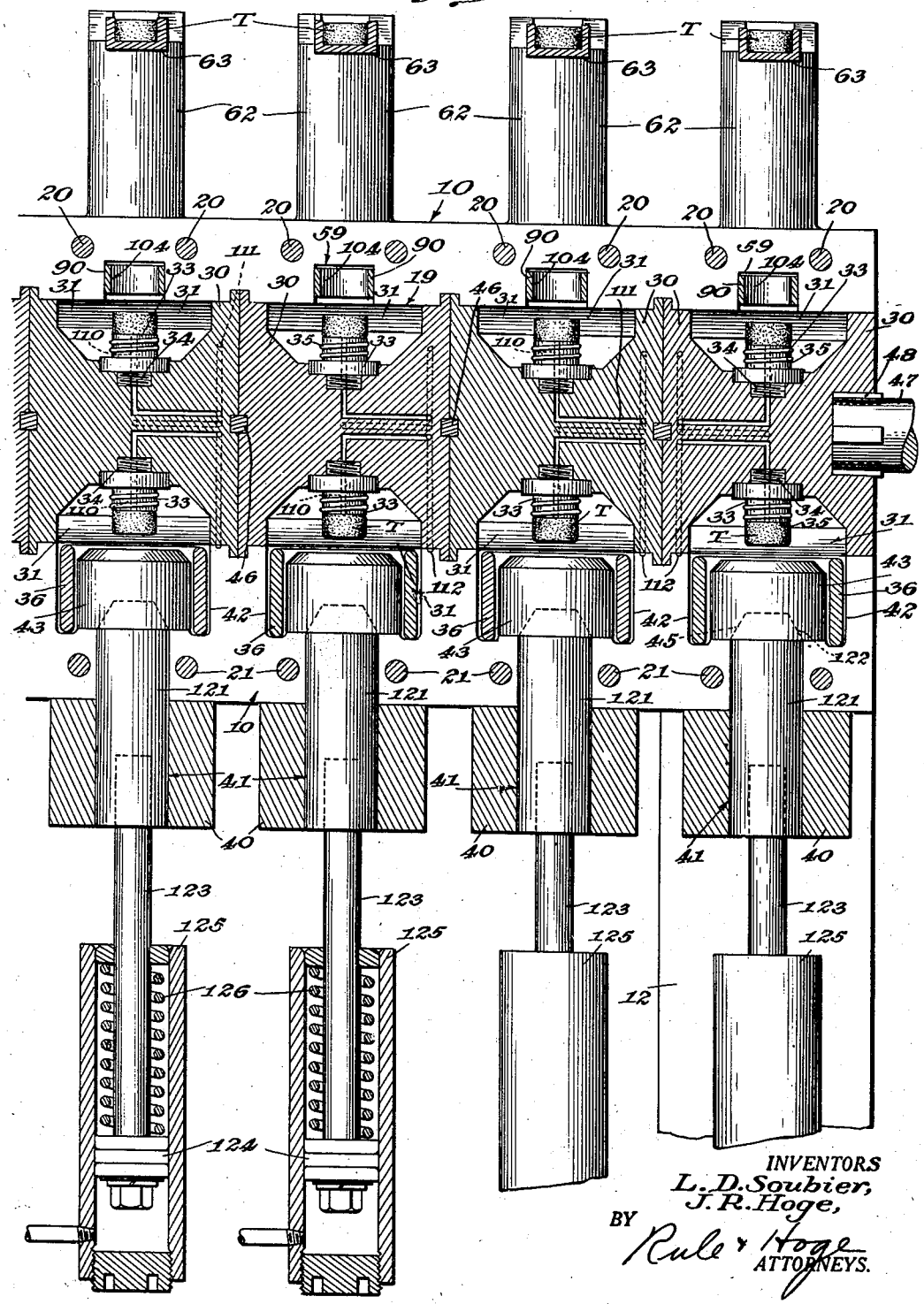
Fig. 8 is a sectional view taken substantially along the line 8—8 of Fig. 4.

The apparatus involves in its general organization a one-piece elongated main or mold head casting 10 (Figs. 2, 4 and 8) which is supported at spaced regions therealong by means of integral webs 11 and supporting leg structures 12. The casting 10 is divided into a number of mold heads 14 (see also Fig. 1) which are arranged in straight line formation and the interiors of which are inter-communicating.

The individual mold heads 14 are identical in construction and therefore a detailed description of one of these heads will suffice for the remainder thereof. Each head 14 includes a plate 15 having marginal strengthening ribs 16 and a medial curved portion 17 which cooperates with a portion of a curved upstanding wall 18 (Fig. 4) formed on the head casting 10 to define therebetween a cylindrical chamber 19 in which a portion of the operative molding instrumentalities are housed. The various chambers communicate with each other in alignment. Upper and lower pairs of cap screws 20 and 21 respectively serve to clamp the plate 15 in position on the head casting 10. Every third (this figure is purely arbitrary) mold head 14 is disposed directly above one of the supporting leg structures 12 and has formed thereon an integral extension 22 of the ribs 16 which extends downwardly (Fig. 4) and is bolted to a shelf 23 formed on the supporting leg structure.

Referring now to Figs. 4 and 8, a series of mandrel-supporting rotors 30 are disposed within the respective chambers 19 of the heads 14 and each rotor is formed with a plurality of sector shaped pockets 31 therein, representing ninety degree sectors, which cooperate with and are closed by the inner wall of the chamber 19. The rotors 30 are adapted to be periodically indexed in unison or moved through an angle of ninety degrees, thus causing the pockets 31 to be moved with the rotors about the axis of the latter. In so moving, these pockets successively occupy positions at a charging zone C, a heating zone H, a forming zone F, and a discharging zone D in a manner and for a purpose that will appear presently.

Disposed on each rotor 30 in the respective pockets 31 and extending radially from the axis of the rotor are a series of forming mandrels 33 upon which the articles to be molded, which in the present instance are bottle caps, are formed. The mandrels 33 are provided with threaded shanks 34 by means of which they are removably secured to the rotor 30. Threads 35 conforming in size and pitch to the size and pitch of the threads to be formed on the bottle caps are provided on the mandrels 33.

The head casting 10 in the vicinity of each head 14 is formed with a relatively large cylindrical boss 40 (Figs. 1, 4 and 8) on the underneath side thereof providing a vertical bore 41 which communicates with a recess 42 that in turn communicates with the chamber 19. A curing mold 43 is disposed within each recess 42 and is normally supported on the bottom thereof. The curing mold 43 is in the form of a cylindrical member having an upwardly presented mold cavity 44 and a downwardly presented tapered recess 45 formed therein. A heating element 36 is disposed in the recess 42 and surrounds the mold 43 and supplies heat thereto by direct radiation.

The mandrel-supporting rotors 30 are keyed together as at 46 (Fig. 8) and are adapted to periodically be indexed or rotated in unison throughout an angle of ninety degrees to successively move the mandrels 33 of each rotor through the charging, heating, forming and discharging zones C, H, F and D respectively. Toward this end, one end of a horizontal shaft 47 is keyed as at 48 to the last rotor 30 of the series of interconnected rotors at one end of the machine. The shaft 47 is provided at its other end with a bevel gear 49 (Figs. 1 and 3) which meshes with a mutilated bevel gear 50 carried at one end of a horizontal shaft 51. A bevel gear 52 mounted on the other end of the shaft 51 meshes with a bevel gear 53 mounted on the upper end of a vertical shaft 54 which carries at its lower end a bevel gear 55, the latter meshing with a bevel gear 56 mounted on a drive shaft 57. The drive shaft 57 is suitably connected to a variable speed transmission device (not shown). The mutilated gear 50 is devoid of teeth in a two hundred seventy degree sector and the number of teeth provided in the remaining ninety degree sector thereof is precisely equal to one-quarter of the number of teeth provided on the gear 49. Consequently, uniform rotation of the drive shaft 57 causes intermittent or periodic rotation of the shaft 47 and the series of interconnected rotors 30 connected thereto throughout an angle of ninety degrees at each indexing movement thereof. Thus, the corresponding mandrels 33 of each rotor are periodically and successively brought into forming alignment with the molds of their respective molding heads 14 in unison. The system or train of gearing just described, including the various shafts and bevel gears, are operatively mounted in and supported by a bracket 58 which forms a stationary part of the machine framework.

Referring now to Figs. 2 and 4, the tablets T or preforms of compressed moldable material are adapted to be successively introduced into the chamber 19 of each head 14 through a feed opening 59 provided in the upper region of the chamber 19 and in the charging zone C. The tablets T are introduced into the chamber 19 in synchronism with the indexing movement of the rotor 30 thereof in such a manner that immediately after each indexing operation of the rotor 30, a tablet T is deposited upon the mandrel 33 in the charging zone C. Means is also provided for applying vacuum to the various mandrels 33 in order to maintain the tablets T thus deposited thereon centered on the mandrels from the time they are received until the mandrels have moved onto the forming zone F and the forming operation has taken place. Toward these ends, the feed opening 59 (Fig. 4) communicates with a horizontally extending channel 61 which extends through the head casting 10. The channel 61 communicates with a vertical chute 62 through which the tablets T move in passing to the chamber 19.

The upper ends of the chutes are disposed just below the level of a series of horizontally disposed slideways 63 or guides (Fig. 2) which overlie the various mold heads 14 and have a common communication with a manifold slideway 64 or guide disposed at right angles thereto. The manifold slideway 64 is adapted to be periodically supplied with tablets T from one end thereof by a suitable tablet feeding mechanism (not shown) and the length of the slideway 64 and the distances between the adjacent slideways 63 are direct multiples of the diameters of the tablets and are so calculated that when the manifold slideway 64 is filled, a tablet T is in alignment with each of the slideways 63. A section of the outer wall of the slideway 64 in alignment with each slideway 63 is cut away and a series of tablet feeding rams 70 are adapted to project through the voids thus created to periodically and simultaneously move the tablets fed to the manifold slideway 64 into the various slideways 63 and advance the same toward the respective chutes 62 for introduction into the chambers 19.

Accordingly, each ram 70 is operatively associated with a vacuum operated cylinder 71 (Fig. 12) having a spring-pressed piston 72 therein to which the ram is connected. Each cylinder 71 is connected through a supporting pipe 73 with a manifold 74 which communicates with a conduit 75 (Fig. 1) which in turn communicates through a control valve 69 with a source of vacuum.

Referring now to Figs. 2, 10 and 11, the control valve 69 just referred to comprises a cylindrical casing 77 having a pair of opposed ports 78 and 79 eccentrically disposed therein. The port 78 is connected by means of a conduit 80 with the source of vacuum while the port 79 is connected to the conduit 75. A rotor 81 which is keyed to a central shaft 82 is provided with an eccentrically disposed passage 83 therein which, upon rotation of the rotor, periodically comes into register with the ports 78 and 79 to cause periodic impulses of vacuum to be transmitted through the valve 69 to the various cylinders 71 simultaneously. The passage 83 communicates with a radial passage 88 which extends to the periphery of the rotor 81 and is adapted to register with a port 89, formed in the casing 77, in passing, thus periodically bleeding the cylinder 71 to the atmosphere.

The shaft 82 (Fig. 2) is provided with a gear 84 which meshes with a gear 85 mounted medially on a shaft 86 (Fig. 3) journaled in the bracket 58. The shaft 86 is driven from the driving shaft 57 through the gear 55 by means of a bevel gear 87 mounted on the shaft 86 and meshing with the gear 55.

Referring now to Fig. 4, the tablets T fed to the upper end of each chute 62 in the manner just described enter the channel 61 and are successively propelled inwardly of the head to the charging opening 59 by means of a reciprocating charging member 90 which is slidably disposed within the channel. The charging member 90 is connected by means of a link 91 to the lower end of an actuating arm 92, the upper end of which is pivoted to a bracket 93 secured to the chute 62. The arm 92 carries a cam roller 94 medially thereof which is adapted to be engaged by a pear-shaped cam member 95 mounted on an elongated horizontally disposed shaft 96 (see also Fig. 1) which is rotatably journaled in supporting brackets 97 secured to the head casting 10.

One end of the shaft 96 carries a bevel gear 98 which meshes with a bevel gear 99 mounted on the upper end of a vertical shaft 100 (Fig. 3), the latter being journaled in the bracket 58. The lower end of the shaft 100 carries a bevel gear 101 which meshes with a bevel gear 102 mounted on an end of the shaft 86. Thus it will be seen that the shaft 96 is indirectly driven from the driving shaft 57 through a gear train, the various elements of which have previously been set forth. Upon engagement of the cam rollers 94 (Fig. 4) by the cams 95, the actuating members 92 are simultaneously drawn outwardly from the heads 14. Coil springs 103 serve to draw the members 92 inwardly of the head and move the charging member 90 in the channel 61 toward the charging opening 59. The charging member 90 is provided with a cavity 104 near the forward end thereof which, upon reciprocation of the member 90, is adapted to be moved from a position of register with the chute 62 to a position of register with the charging opening 59 and vice versa. Thus, each time the cavity 104 comes into register with the chute 62, a tablet T is deposited therein and, when the cavity 104 comes into register with the charging opening 59, the tablet T drops by gravity onto the mandrel 33 positioned in the chamber 19 at the charging zone C.

Referring now to Fig. 4, the tablet T deposited on the mandrel 33 at the charging zone C is adapted to be retained thereon by the application of vacuum to the mandrel from the moment the tablet is received until after the tablet has been formed into the completed article at the forming zone F. Accordingly, each mandrel 33 is provided with a narrow bore 110 (see also Fig. 8) which extends completely therethrough and which communicates with a vacuum passage 111 provided in the rotor 30. The various vacuum passages 111 terminate at the periphery of the rotor and are adapted to successively register with an arcuate vacuum groove 112 which extends partially around the inner surface of the chamber 19 from a point which is accessible to the passage 111 when the corresponding mandrel 33 is in the charging position to a point in the region between the forming zone F and the discharging zone D. The vacuum groove 112 communicates with a vacuum passage 113 which extends through the plate 15 and which is connected by means of a vacuum conduit 114 (Fig. 1) to the source of vacuum.

The wall of each chamber 19 in the vicinity of the heating zone H is recessed as at 115 and an electric heating element 116 is nested within the recess. Heat generated by the heating element 116 is confined within the successive pockets 31 and is assimilated by the tablets T at the heating zone, thus preheating the same prior to the forming operation which takes place shortly thereafter at the forming zone F.

Referring now to Figs. 4 and 6, the molds 43 which are seated on the bottom of the recesses 42 in the forming zone F of each mold head 14 are adapted to be simultaneously elevated into forming engagement with the various mandrels 33 which are successively brought into alignment therewith. Accordingly, a series of pressure applying rams 121 are slidably disposed within the respective bores 41 provided in the bosses 40. The upper end of each ram 121 is tapered as at 122 and this tapered portion projects upwardly above the bottom of the recess 42 and is complemental to the tapered recess 45 provided in each mold 43. Thus when a mold is seated in the recess 42 at the forming zone, accurate registry with the forming mandrel 33 thereabove is assured.

In order to raise and lower the molds, each ram 121 is connected at its lower end to a piston rod 123, the piston 124 of which is slidably mounted within a cylinder 125 which is disposed directly beneath the boss 40 provided on the mold head casting 10. A spring 126 mounted in the cylinder 125 causes downward movement of the piston after it has completed its pressure stroke during the forming operation.

The cylinders 125 are adapted to be actuated in unison to raise the various molds 43 into forming engagement with the mandrels 33 and the control instrumentalities for effecting such actuation appear in Fig. 9. No claim is made in this application to these control instrumentalities as they are fully illustrated, described and claimed in our copending application, Serial Number 66,674, filed March 2, 1936, for Method of and apparatus for curing and molding synthetic or natural resins, and reference may be had thereto for a full disclosure thereof. Briefly, however, these control instrumentalities comprise a control valve 130 (Fig. 9) by means of which hydraulic pressure is alternately applied to the opposite ends of the cylinder, together with a control mechanism 131 consisting of a series of cam controlled instrumentalities for mechanically actuating the valve 130. The control mechanism 131 is driven from a bevel gear 132 mounted on one end of a shaft 133 journaled in the bracket 58. The other end of the shaft 133 carries a bevel gear 134 which derives its motion from the bevel gear 101.

Referring now to Figs. 4, 5, 6 and 7, the ejecting mechanisms by means of which the formed caps are removed from the mandrels 33 of the respective heads 14 each comprises a cap-spinning chuck 140 including a face plate 141 which is secured to one end of a sleeve 142, the latter being provided with a resilient face pad 143. The sleeve 142 is rotatably disposed upon a non-rotatable hollow shaft 144 and is provided with an enlarged portion 145 in which is disposed an enlargement 146 formed on the shaft 144. The sleeve 142 is rotatably journaled in bearings 147 and 148 provided in the furcations of an adjustable bifurcated bracket 149 secured to the head casting 10. The shaft 144 is provided with right and left hand threads which are alternately engageable with a pulley 150 which is mounted on the shaft and which is uniformly driven in one direction by means of a cord 151 passing thereover. The sleeve 142 has formed thereon a pair of elongated splines 152 which pass through slots 153 (Fig. 7) formed at diametrically opposed points in the pulley 150 and which are slidable therein. The sleeve 142 is therefore rotatable with the pulley 150 and is capable of axial sliding movement with respect thereto. The outer end of the shaft 144 is secured in a vacuum chest 154 and the shaft is prevented from rotating by means of a slide member 155 which reciprocates in a slideway 156 carried by a bracket 157 secured to a discharge trough 158 which in turn is secured to the head casting 10. The shaft 144 and chuck 140 thereon are in alignment with an opening 159 formed in the wall of the head casting 10 at the discharging zone D. Thus it will be seen that upon rotation of the pulley 150 in one direction, the non-rotatable shaft 144 reciprocates axially and the chuck 140 is periodically projected through the opening 159 and engages the formed caps on the mandrels 33.

In order to remove the caps from the mandrels 33, means is provided for applying a vacuum to the chuck 140 when the latter comes into engagement with each cap. Toward this end the shaft 133 has mounted thereon a gear 160 which meshes with a gear 161 carried by a shaft 162 journaled in the bracket 58. The cord 151 which drives the pulley 150 passes over a driving pulley 163 mounted on the shaft 162 and also passes over a pair of idler pulleys 164 and 165.

A cam member 166 is mounted on the shaft 162 and is provided with a cam groove 167 near the periphery thereof. A valve cylinder 168 having ports 169 and 170 has a slide valve 171 slidably disposed thereon and arranged to periodically establish communication between the ports 169 and 170 and also to bleed the port 170 periodically to the atmosphere. A valve stem 172 connected to the valve 171 projects from the cylinder 168 and carries at the free end thereof a finger 173 which extends into the cam groove 167. The port 169 is connected through a conduit 174 to the source of vacuum while the port 170 is connected through a short conduit section 175 to a manifold conduit 176 which is connected by means of a series of flexible conduits 177 to the various vacuum chests 154. Thus it will be seen that upon rotation of the cam member 166, vacuum is periodically applied to all of the vacuum chests 154 in unison each time the slide valve 171 establishes communication between the ports 169 and 170.

The cam controlled mechanism just described is so designed that vacuum is applied to the chuck 140 when the latter engages the cap which has been formed on the mandrel 33 at the discharging zone D. The threads provided on the shaft 144 are of the same pitch as the threads formed on the mandrels 33 and thus the shaft 144 is withdrawn from the opening 159 in the manner previously described, and the caps are unscrewed from the mandrels on which they have been formed.

The vacuum supplied to the chuck 140 is discontinued after the caps have been withdrawn from the opening 159 and thus the caps fall into the discharge trough 158 and are conveyed therealong to a point of discharge by means of a trough conveyor 180.

In order to dislodge any particles of moldable material that may adhere to the mandrels 33 after the molded caps have been removed therefrom, blasts of air may be directed against the opposite sides thereof through air passages 181 which are formed in the wall 18 of each mold head 14.

Modifications may be resorted to within the spirit and scope of the appended claims.

We claim:

1. In an apparatus for molding articles from compressed charges of synthetic resinous materials and like organic plastic materials by the application of heat and pressure, a rotor mounted for rotation about a horizontal axis, said rotor including an annular series of radial walls separating its periphery into outwardly opening chambers, a mandrel positioned in each chamber and having its axis disposed radially of the rotor, a housing enclosing the rotor and mandrels and including a continuous curved wall which is constantly in contact with the outer ends of the walls of the rotor, said housing having charging and discharging openings for mold charges and finished articles respectively, a mold common to the mandrels, means for moving the rotor intermittently to thereby bring the mandrels one at a time into register with the mold, means for effecting relative movement between the mold and mandrels to thereby finally shape the article and means for preheating the mold charges during movement thereof from the charging opening to the mold and for heating said mold.

2. In an apparatus for molding articles from compressed charges of synthetic resinous materials and like organic plastic materials by the application of heat and pressure, a rotor mounted for rotation about a horizontal axis, said rotor including an annular series of radial walls separating its periphery into outwardly opening chambers, a mandrel positioned in each chamber and having its axis disposed radially of the rotor, a housing enclosing the rotor and mandrels and including a continuous curved wall which is constantly in contact with the outer ends of the walls of the rotor, said housing having charging and discharging openings for mold charges and finished articles respectively, a mold common to the mandrels, means for moving the rotor intermittently to thereby bring the mandrels one at a time into register with the mold, means for effecting relative movement between the mold and mandrels to thereby finally shape the article, means for preheating the mold charges during movement thereof from the charging opening to the mold and for heating said mold, and a take-out device movable into the discharging opening at regular time intervals for removing finished articles from the mandrels.

3. In an apparatus for molding articles from compressed charges of synthetic resinous materials and like organic plastic materials by the application of heat and pressure, a rotor mounted for rotation about a horizontal axis, said rotor including an annular series of radial walls separating its periphery into outwardly opening chambers, a mandrel positioned in each chamber and having its axis disposed radially of the rotor, a housing enclosing the rotor and mandrels and including a continuous curved wall which is constantly in contact with the outer ends of the walls of the rotor, said housing having charging and discharging openings for mold charges and finished articles respectively, a mold common to the mandrels, means for moving the rotor intermittently to thereby bring the mandrels one at a time into register with the mold, means for effecting relative movement between the mold and mandrels to thereby finally shape the article and means for preheating the mold charges during movement thereof from the charging opening to the mold and for heating said mold, said heating means including a heating element positioned in the inner wall of the housing between the charging opening and said mold and a heating element encircling the mold.

4. Apparatus of the character described comprising a horizontally disposed cylindrical housing having a charging opening in its upper side, an article discharging opening spaced approximately 90° from the charging opening and a mold receiving opening below and in register with said charging opening, a heating element in the inner wall of the housing directly opposite the article discharging opening, an annular series of mandrels mounted for rotation within said housing, means for imparting intermittent rotary movement to said mandrels to thereby bring them one at a time to a standstill in register with the charging opening, heating element, mold and article discharging opening successively in the order named, a mold common to said mandrels movable through said mold receiving opening for cooperation with the mandrels and means for moving said mold.

5. Apparatus of the character described comprising a horizontally disposed cylindrical housing having a charging opening in its upper side, an article discharging opening spaced approximately 90° from the charging opening and a mold receiving opening below and in register with said charging opening, a heating element in the inner wall of the housing directly opposite the article discharging opening, an annular series of mandrels mounted for rotation within said housing, means for imparting intermittent rotary movement to said mandrels to thereby bring them one at a time to a standstill in register with the charging opening, heating element, mold and article discharging opening successively in the order named, a mold common to said mandrels movable through said mold receiving opening for cooperation with the mandrels, means for moving said mold, and take-out mechanism movable into said article discharging opening at regular time intervals for detaching finished articles from the mandrels and moving them to the exterior of said housing.

LEONARD D. SOUBIER.
JOHN R. HOGE.